(12) United States Patent
Bowlin et al.

(10) Patent No.: US 9,182,026 B2
(45) Date of Patent: Nov. 10, 2015

(54) CAM FOLLOWER ARRANGEMENT

(71) Applicant: Belvac Production Machinery, Inc., Lynchburg, VA (US)

(72) Inventors: Geoffrey R. Bowlin, Oak Ridge, NC (US); Jeffrey L. Shortridge, Lynchburg, VA (US); Randy E. Yoder, Forest, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 121 days.

(21) Appl. No.: 13/791,717

(22) Filed: Mar. 8, 2013

(65) Prior Publication Data

US 2013/0233123 A1 Sep. 12, 2013

Related U.S. Application Data

(60) Provisional application No. 61/608,316, filed on Mar. 8, 2012.

(51) Int. Cl.
*F16H 53/06* (2006.01)
*B21D 51/26* (2006.01)

(52) U.S. Cl.
CPC ............ *F16H 53/06* (2013.01); *B21D 51/2638* (2013.01); *Y10T 74/2107* (2015.01)

(58) Field of Classification Search
USPC .................................................... 74/89, 569
See application file for complete search history.

(56) References Cited

U.S. PATENT DOCUMENTS 5,373,934 A 12/1994 Jackson et al.
5,586,467 A * 12/1996 Weber ................................ 74/57
5,676,006 A 10/1997 Marshall
5,957,655 A 9/1999 Gomez
6,061,900 A * 5/2000 Kano ............................... 29/740
6,779,651 B1 * 8/2004 Linglet et al. .............. 198/803.9

(Continued)

FOREIGN PATENT DOCUMENTS

EP 0 384 427 8/1990
FR 2389580 12/1978

(Continued)

OTHER PUBLICATIONS

International Search Report for International Application No. PCT/US2013/030031, dated May 23, 2013, 6 pages.

(Continued)

*Primary Examiner* — Vicky Johnson
(74) *Attorney, Agent, or Firm* — Nixon Peabody LLP

(57) ABSTRACT

A cam follower assembly includes a housing. The cam follower assembly includes a first cam follower and a second cam follower to contact a cam surface. The cam follower assembly includes a first holding element coupled to the first cam follower, and a second holding element coupled to the second cam follower. The second holding element is assembled with the first holding element and received in an opening of the housing, where the first holding device moves relative to the second holding device. An adjusting element of compressible material determines the relative movement between the first holding device and the second holding device. The first cam follower moves relative to the second cam follower according to the relative movement between the first holding element and the second holding element. The first cam follower and the second cam follower maintain contact with the cam surface according to their relative movement.

17 Claims, 12 Drawing Sheets

(56) References Cited

U.S. PATENT DOCUMENTS

| | | |
|---|---|---|
| 7,263,867 B2 * | 9/2007 | Bartosch et al. ............... 72/94 |
| 7,497,145 B2 * | 3/2009 | El Hachem et al. ............ 74/569 |
| 7,818,987 B2 * | 10/2010 | Marshall ....................... 72/94 |
| 8,006,826 B2 | 8/2011 | Licht |
| 8,047,094 B2 * | 11/2011 | Love et al. ................ 74/490.05 |
| 8,245,551 B2 | 8/2012 | Egerton |
| 2007/0227859 A1 | 10/2007 | Marshall et al. |
| 2010/0212130 A1 | 8/2010 | Marshall |

FOREIGN PATENT DOCUMENTS

| | | |
|---|---|---|
| WO | 01/44084 | 6/2001 |
| WO | 2007/031239 | 3/2007 |

OTHER PUBLICATIONS

Written Opinion for International Application No. PCT/US2013/030031, dated May 23, 2013, 5 pages.

* cited by examiner

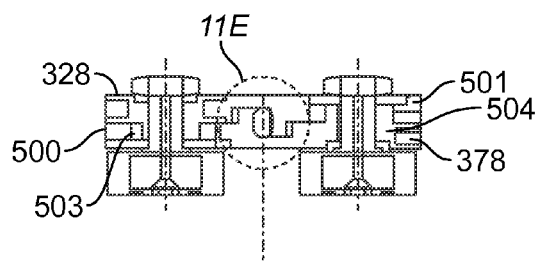
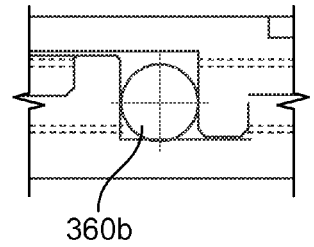
FIG. 11D  FIG. 11E
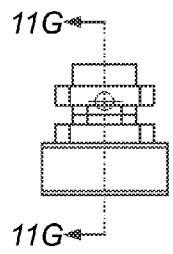
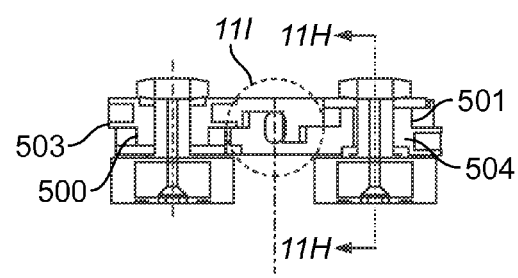
FIG. 11F  FIG. 11G
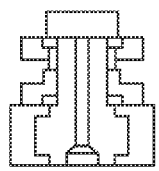
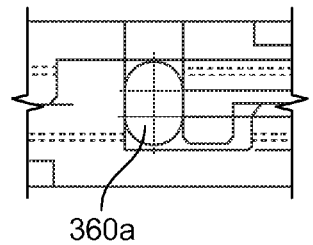
FIG. 11H  FIG. 11I

CAM FOLLOWER ARRANGEMENT

CROSS-REFERENCE TO RELATED APPLICATIONS

This application claims the benefit of U.S. Provisional Application No. 61/608,316, filed Mar. 8, 2012, which is hereby incorporated entirely herein by reference.

FIELD OF THE INVENTION

The present invention relates generally to manufacturing machinery, and more particularly to systems and methods employing a cam follower arrangement in a machine assembly.

BACKGROUND OF THE INVENTION

Cam follower arrangements may be used in a turret assembly of a machine arrangement to help change a position of a ram assembly, such as a push or die ram assembly, relative to a lateral axis of a shaft of the turret assembly. Specifically, the cam follower arrangement may include cam follower(s) that follow a cam of the turret assembly so that components (e.g. tooling, push plate) connected to the ram assembly may influence an article (e.g. can, container). Conventional cam follower arrangements have shorter life spans, e.g. 6000-8000 hours, resulting from the manner in which the cam follower(s) is mounted to the ram assembly.

One type of conventional cam follower arrangement includes a single cam follower rigidly mounted on a translating element or housing of the ram assembly. Motion of the translating element is controlled by the interaction between the cam follower and cam surfaces of a groove in the cam. A clearance exists between the cam follower diameter and the cam surfaces to allow the cam follower to rotate. Disadvantages result because undesirable skidding may occur between the cam follower and the cam surfaces due to a direction change in translation that causes a direction change in rotation. The undesirable skidding increases when the speed of the shaft increases. Such skidding decreases the life of the turret assembly because it results in unnecessary wear and tear on the cam follower and cam surfaces.

Another type of conventional cam follower arrangement includes two cam followers rigidly mounted on a translating element or housing of the ram assembly. Motion of the translating element is controlled by interaction between the cam followers and cam surfaces of a rib on the cam. The second type of conventional cam follower arrangement maintains a constant rotational direction, but a clearance exists between the cam follower and the cam surfaces to accommodate for variations in the cam follower diameter and rib thickness. Disadvantages result because undesirable skidding may occur due to a direction change in translation, thereby resulting in the cam followers going from not contacting the rib to contacting the rib. The skidding decreases the life of the turret assembly because it results in unnecessary wear and tear on the cam followers and cam surfaces.

Another type of conventional cam follower arrangement includes two cam followers where the first cam follower rigidly mounts to a translating element or housing of the ram assembly and the second cam follower mounts to a spring between the second cam follower and the translating element. Motion of the translating element is controlled by interaction between the two cam followers and the cam surfaces of a rib on the cam. No clearance exists in the third type of cam follower arrangement. Instead, a spring keeps the cam followers in constant contact with the cam surfaces by accommodating for variations in cam follower diameter and rib thickness. Disadvantages may result because the spring creates a large spring force to counteract the forces created by the acceleration imparted to the translating element by the cam surfaces. For example, the spring force may be between about 150-200 lbf. The spring force depends on the dimensional variations within tolerance ranges. The spring force is affected by the shape of the cam surfaces and the mass of the translating element, thereby exerting an unnecessary average force on the cam followers and the cam surfaces. The unnecessary force may wear down the cam followers and cam surfaces, thereby reducing the life of the turret assembly.

SUMMARY OF THE INVENTION

In view of the foregoing, systems and methods according to aspects of the present invention employ a cam follower arrangement/assembly that minimizes or eliminates skidding while also minimizing the average load exerted on the cam followers and the cam surfaces.

According an example embodiment, an embodiment includes a housing that has an opening. The housing is coupled to a tool. The embodiment includes a first cam follower and a second cam follower configured to contact a cam surface. The embodiment includes a first holding element coupled to the first cam follower, and a second holding element coupled to the second cam follower. The second holding element is assembled with the first holding element to be received in the opening of the housing. The first holding device and the second holding device are configured to move relative to each other when assembled together. The embodiment includes an adjusting element formed from a compressible material. The adjusting element provides a bias to the first holding device and the second holding device and determines the relative movement between the first holding element and the second holding element. The first cam follower and the second cam follower move relative to each other according to the relative movement between the first holding element and the second holding element. The first cam follower and the second cam follower maintain contact with the cam surface according to the relative movement between the first cam follower and the second cam follower. The cam surface determines the movement of the tool coupled to the housing. In some cases, the assembled first holding element and second holding element move relative to the housing in the opening. In other cases, the embodiment also includes at least one working element. The at least one working element is disposed between the housing and the assembled first holding element and second holding element when the assembled first holding element and second holding element are disposed in the opening.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

Features, aspects and advantages of the disclosed embodiments will become apparent from the following description and the accompanying exemplary embodiments shown in the drawings, which are briefly described below.

FIG. 11D is a cross-sectional view of FIG. 11C.

FIG. 11E is a close-up view of section 11E of FIG. 11D.

FIG. 11F is a front view of the cam follower arrangement of FIG. 11B when the cam follower arrangement is in the working position.

FIG. 11G is a cross-sectional view of FIG. 11E.

FIG. 11H is a cross-sectional view of FIG. 11G.

FIG. 11I is a close-up view of FIG. 11G.

DETAILED DESCRIPTION

Figure 1:
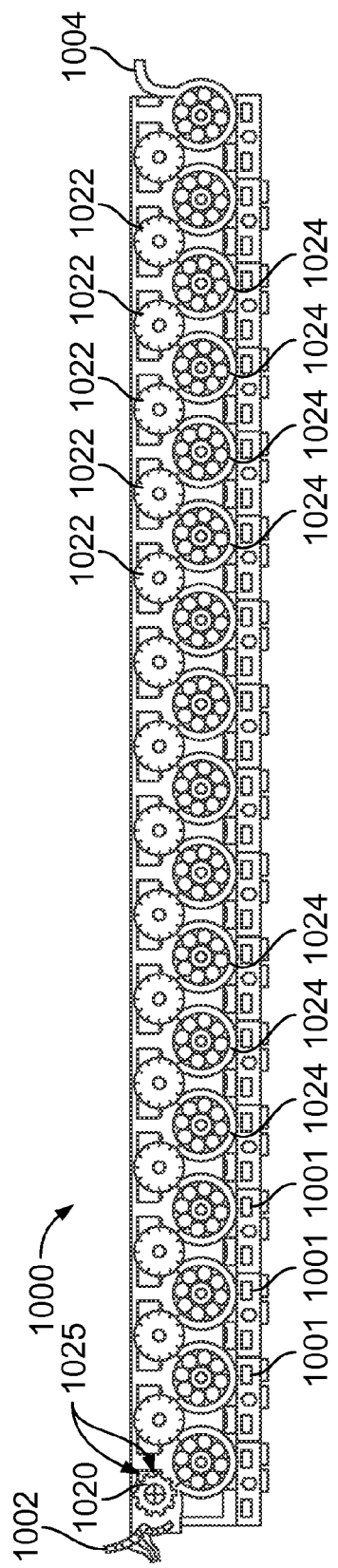
FIG. 1 is a side view of a machine arrangement.
Figure 2:
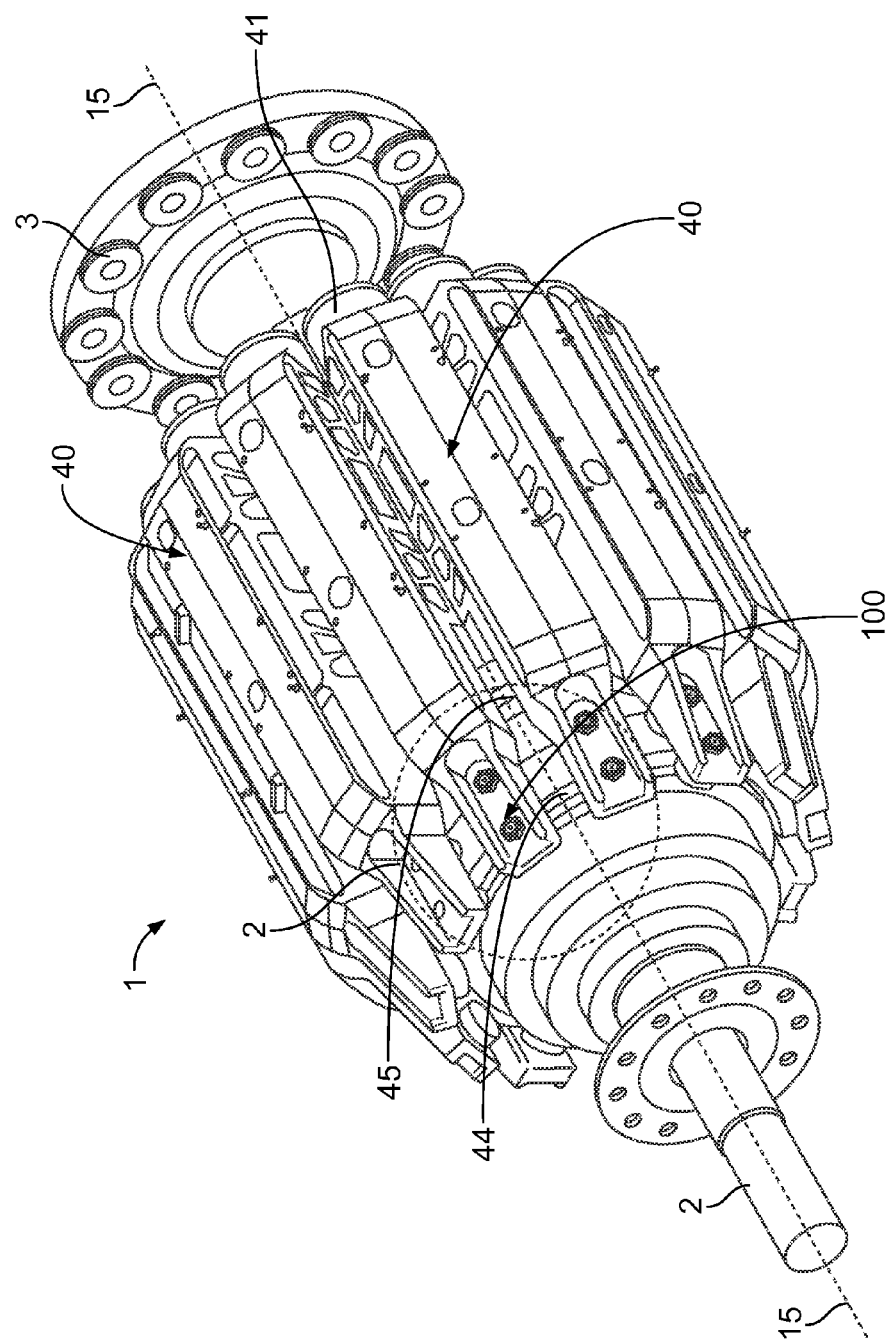
FIG. 2 is a side elevated view of a turret assembly according to aspects of the present invention.

Embodiments are illustrated in the drawings. An effort has been made to use the same or like reference numbers throughout the drawings to refer to the same or like parts. The present disclosure relates to a cam follower arrangement for use in a machine assembly. In particular, the cam follower arrangement minimizes or eliminates skidding while also minimizing the average load exerted on cam followers of the cam follower arrangement and the cam surfaces of a cam of the machine assembly.

As shown in FIG. 1, a machine arrangement 1000 may include a plurality of machine modules 1001 arranged to cooperate with each other. Although the machine arrangement 1000 is shown as a linear machine line in FIG. 1, embodiments may employ other types of machine lines, such as a recirculated machine line. The machine modules 1001 include vertically or horizontally oriented turret assemblies configured to modify articles (e.g., a can, a container, or the like) by performing a working operation (e.g., form, process) on the articles. After entering the machine arrangement 1000 through an article infeed 1002, each article is received by a turret starwheel 1022 and then travels from the turret starwheel 1022 to a transfer starwheel 1024 and from the transfer starwheel 1024 to another turret starwheel 1022 until the article reaches the article discharge 1004. Each starwheel 1020, 1022, 1024 may have any number of pockets 1025 to hold the articles for processing and/or transfer.

FIGS. 2-5 illustrate an example turret assembly 1. The turret starwheel 1022 is mounted to a starwheel mount 3 of the turret assembly 1. While each article is in the pocket 1025 of the turret starwheel 1022, a ram assembly 40 in the turret assembly 1 performs a working operation on the article at a tooling end 41 of the turret assembly 1. In particular, the articles may remain stationary along an axis 15-15, while the ram assembly 40 moves along the axis 15-15 relative to the article to engage the article and perform the working operation. The axis 15-15 may extend along a shaft 2 of the turret assembly 1.

Figure 3:
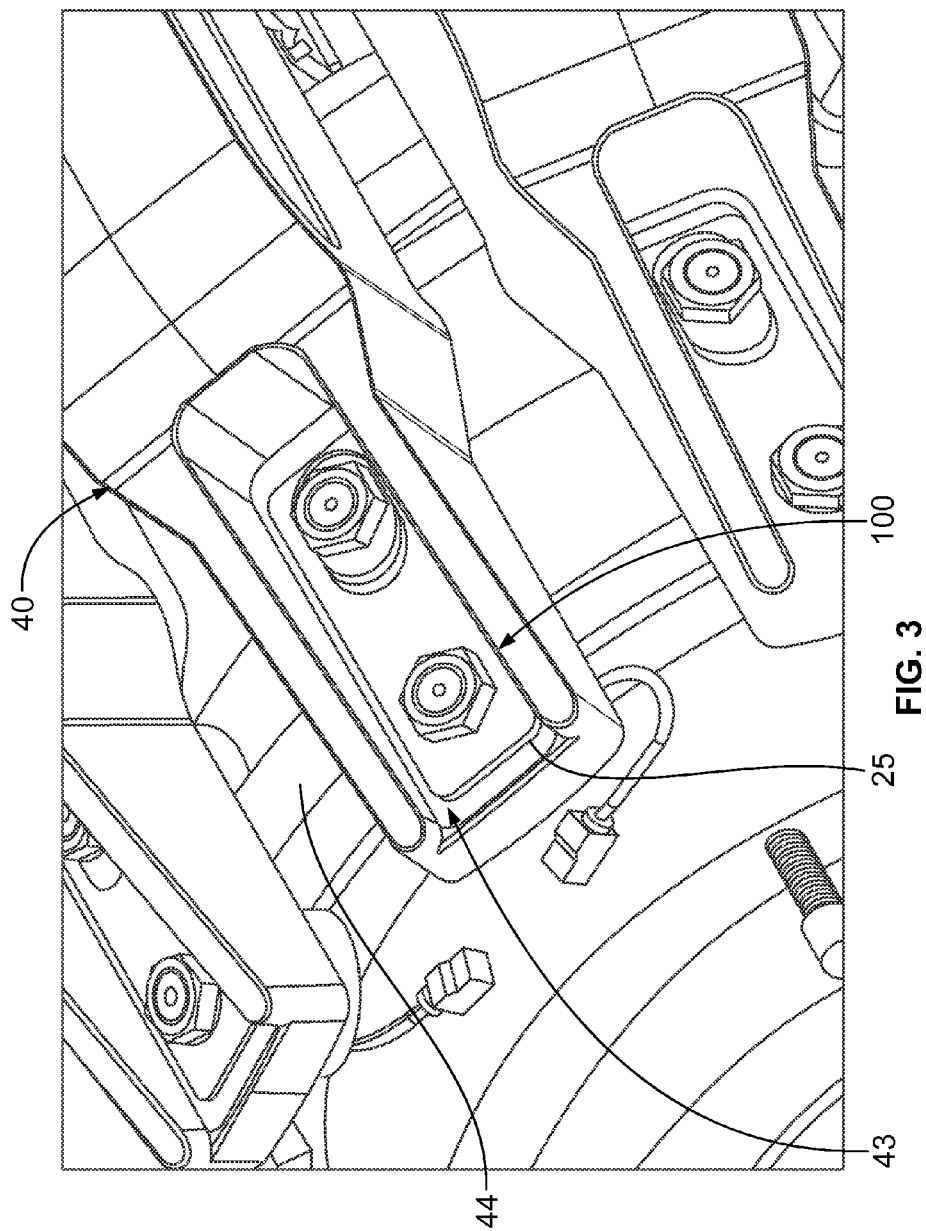
FIG. 3 is a view of section C of the turret assembly of FIG. 2.
Figure 4:
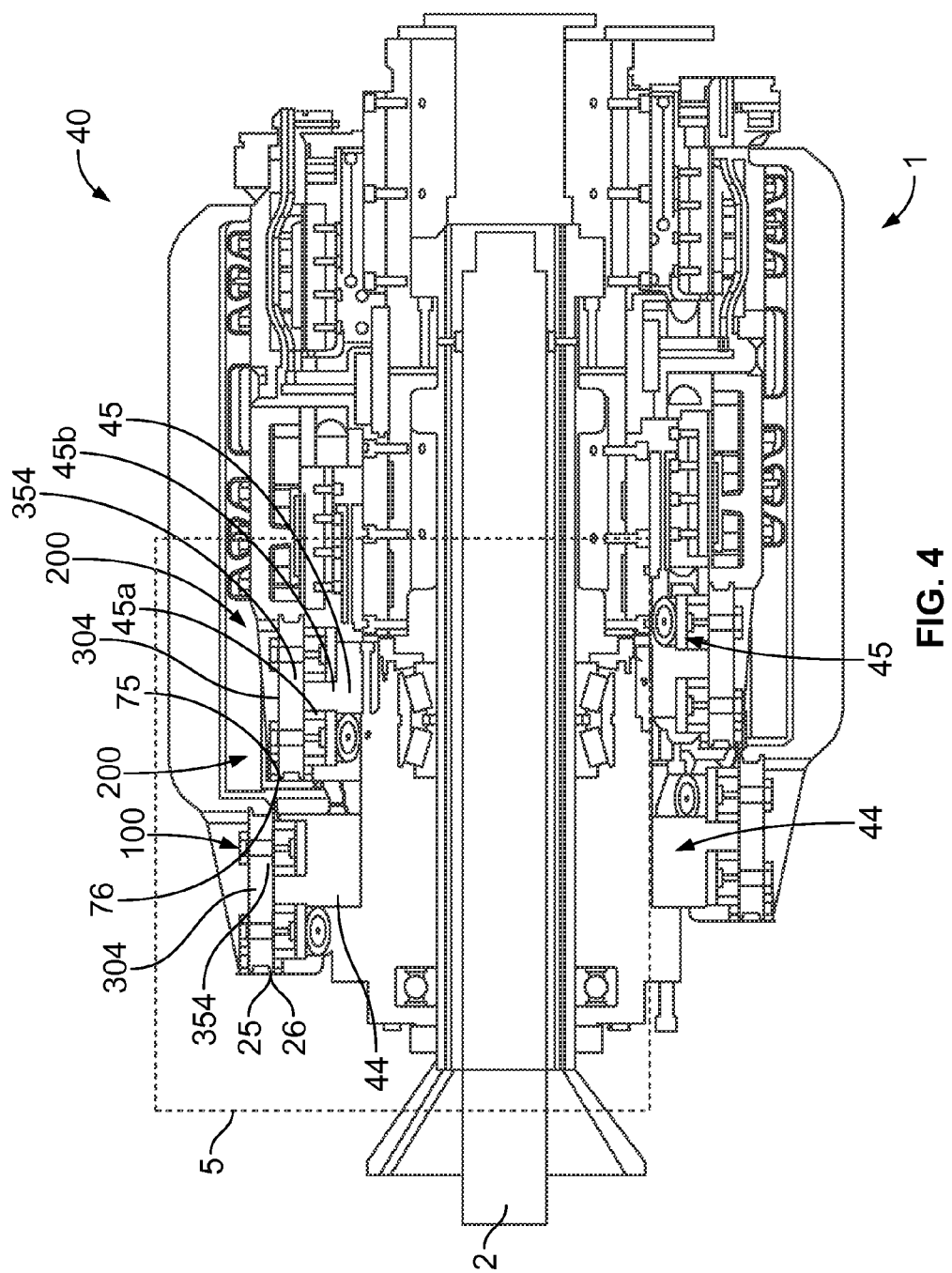
FIG. 4 is a cross-sectional view of FIG. 2.

As shown in FIGS. 2-5, the ram assembly 40 includes two cam follower arrangements 100, 200 The interaction between the cam follower arrangements 100, 200 and respective cams 44, 45 of the turret assembly 1 causes the ram assembly 40 to engage the article and perform the working operation on the article. In particular, the cam 44 includes cam/rib surfaces 44a, b that apply a force to the cam follower arrangement 100, and correspondingly the cam 45 includes cam/rib surfaces 45a, b that apply a force to the cam follower arrangement 200. The forces against the cam follower arrangements 100, 200 cause the ram assembly 40 to move as required. As illustrated in FIGS. 3 and 4, the ram assembly 40 includes two housings 43, 53 with openings 25, 75 that receive the cam follower arrangements 100, 200, respectively.

Figure 6:
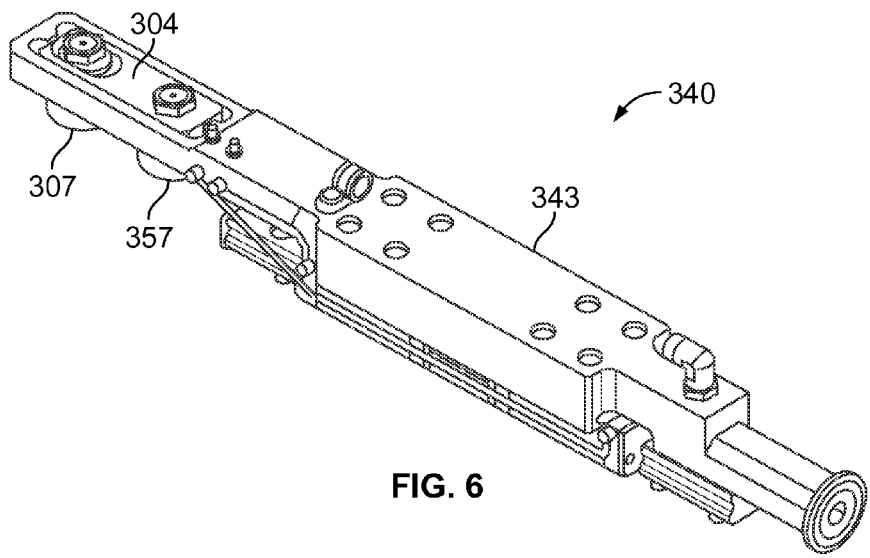
FIG. 6 is a side profile view of a ram assembly with a cam follower arrangement according to aspects of the present invention.
Figure 7:
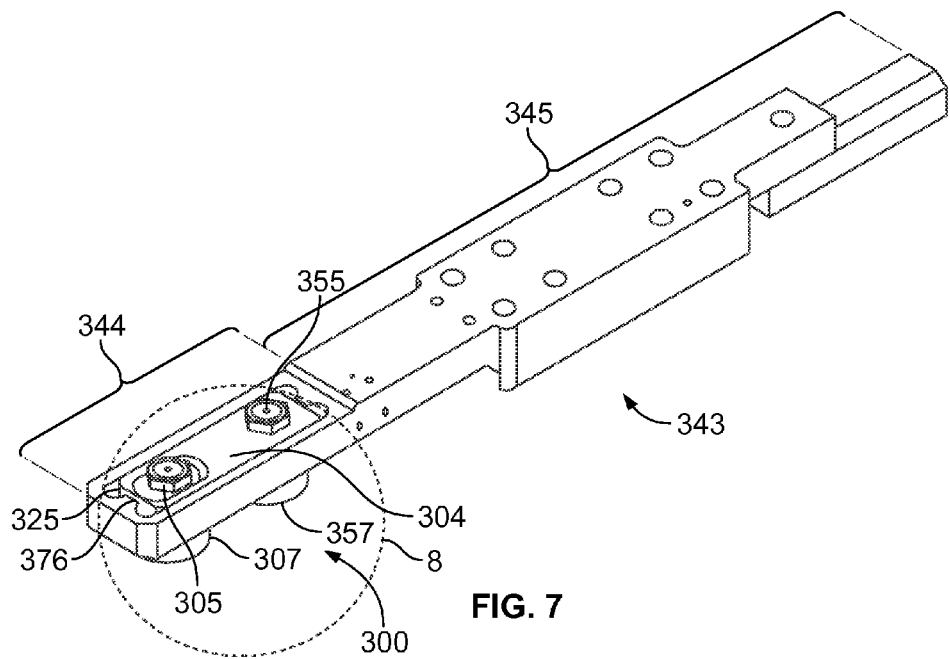
FIG. 7 is a side profile view of the housing of the ram assembly of FIG. 6 when the cam follower arrangement is in a working position.

Alternatively, other embodiments may employ a ram assembly 340 that includes a single cam follower arrangement 300 as shown in FIGS. 6 and 7. As illustrated in FIG. 7, the ram assembly 340 includes one housing 343 with an opening 325 that receives the cam follower arrangement 300.

The housing of each cam follower arrangement may be integrally formed from one piece of material or may be assembled from more than one piece. For example, as shown in FIG. 7, the housing 343 may include a first portion 344 and a second portion 345. The first and second portions 344, 345 may be integrally formed from one piece of material or may be assembled from two respective pieces. In FIG. 7, the first portion 344 generally corresponds with the opening 325 for the cam follower arrangement 300 and the second portion 345 generally extends from the cam follower arrangement 300. However, it is understood that the housing for a cam follower arrangement may include any number of portions having any configuration. In some embodiments, a housing formed from more than one piece may facilitate assembly with the corresponding cam follower arrangement, but in other embodiments, a housing integrally formed from one piece of material may be stronger and more stable.

Aspects of the present invention described herein with reference to FIGS. 2-16 generally apply to any individual cam follower arrangement, regardless of the number of cam follower arrangements on a ram assembly. Accordingly, general reference to a cam follower arrangement and its corresponding housing may apply, for example, to any of the cam follower arrangements 100, 200, 300, 400 described herein and its respective housing (e.g., housing 43, 53, and 343).

Each cam follower arrangement includes a first holding element 304 and a second holding element 354. As shown, for example, in FIGS. 4, 5, 8, and 9, the first and second holding elements 304, 354 are mounted in the housing for the cam follower arrangement. A first cam follower 307 is coupled to the first holding element 304, and a second cam follower 357 is coupled to the second holding element 354. The first and second holding elements 304, 354 may be substantially identical components that are combined in an interlocking arrangement. The first holding element 304 is disposed in a first orientation, while the second holding element 354 is disposed in an opposing, mirroring second orientation. As described further below, the first and second holding elements 304, 354 move relative to each other to allow the first and second cam followers 307, 357 to engage a corresponding cam surface in a manner that minimizes or eliminates skidding while also minimizing the average load exerted between the cam followers 307, 357 and the cam surfaces. A compressible adjustment element 360, described further below, is disposed between the first and second holding elements 304, 354 to determine the relative movement between the first and second holding elements 304, 354.

Figure 8:
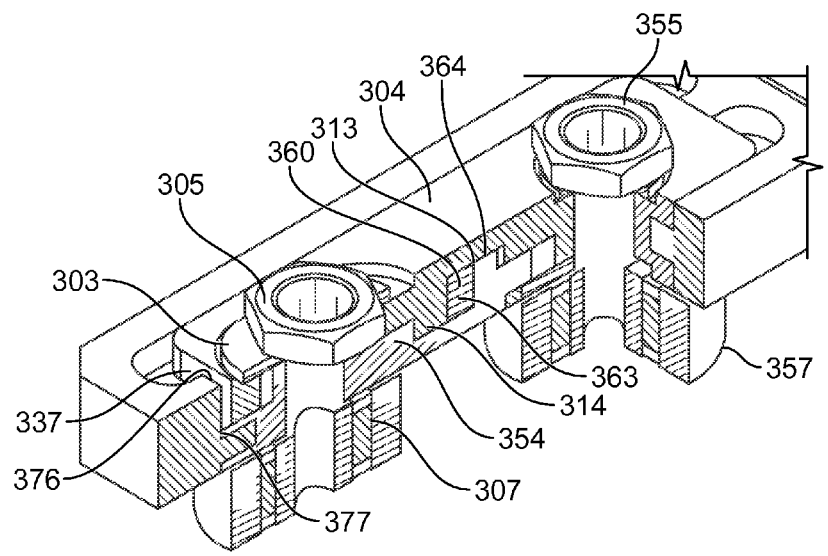
FIG. 8 is a partial cut-out view of section E of FIG. 7.
Figure 16:
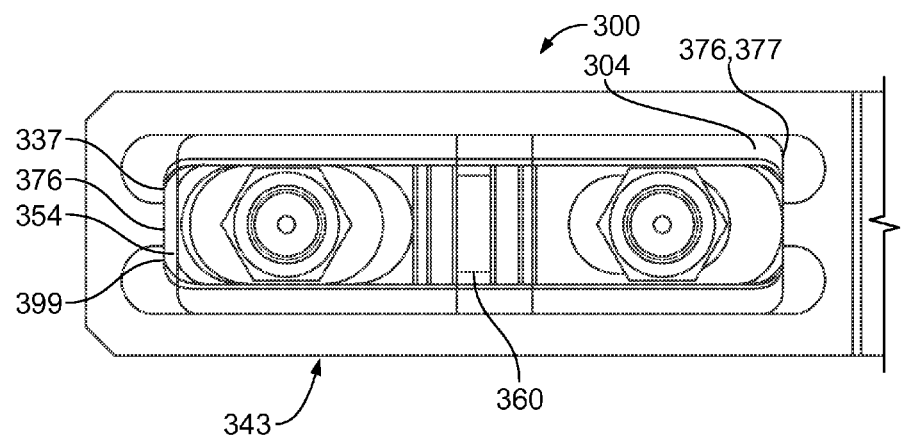
FIG. 16 is a top view of a cam follower arrangement according to aspects of the present invention.

As illustrated in FIGS. 8 and 16, for example, the first holding element 304 has an outer edge 337, and the second holding element 354 has an outer edge 377. When the cam follower arrangement with assembled first and second holding elements 304, 354 are disposed in the housing, there is a varying clearance in the axial direction between the outer edges 337, 377 and the corresponding inner edge of the housing opening. As shown in FIGS. 3, 4, 7, and 8, for example, the housings 43, 53, 343 have corresponding inner edges 26, 76, 376, respectively. The clearance may depend on the size of the ram assembly.

As the cam followers 307, 357 engage the corresponding cam surfaces, the cam follower arrangement moves from a working state, where the ram assembly operates on an article, to a non-working state, where the ram assembly is not operating on an article. In some embodiments, the clearance between the outer edges 337, 377 and the corresponding inner edge of the housing opening may be about 0.012 inches when the cam follower arrangement is in the working state and about 0.10 inches when the cam follower arrangement is in the non-working state. In some embodiments, the clearance in the non-working state may equal the clearance in the working state (such as 0.012 inches) plus a decompression value (such as 0.090 inches) of the adjusting element 360. When in the working state, the clearance may only exist on one side of the cam follower arrangement. For example, as shown in FIG. 16, when the cam follower arrangement 300 is in the working state, the clearance 399 between the outer edge 337 of the holding element 304 and the inner edge 376 of the housing 343 may be about 0.012 inches on one side (left) of the cam follower arrangement 300 and about 0 inches on the other side (right) of the cam follower arrangement 300. In particular, in the working state, the driving force applied by the cam surfaces against the cam followers 307, 357 in one direction causes the cam follower arrangement to move in the same direction and abut one side of the housing opening. The clearance at this side of the housing opening may decrease to 0 inches.

The first and second holding elements 304, 354 are configured to move independently, relative to each other. When the cam follower arrangement is in the working state, the driving force acts to compress the adjustment element 360 between the first and second holding elements 304, 354 and to cause the first and second holding elements 304, 354 to move toward each other. When the cam follower arrangement is in the non-working position, the first and second holding elements 304, 354 move away from each other due to the decompression of the adjustment element 360 in the absence of the driving force.

Figure 11A:
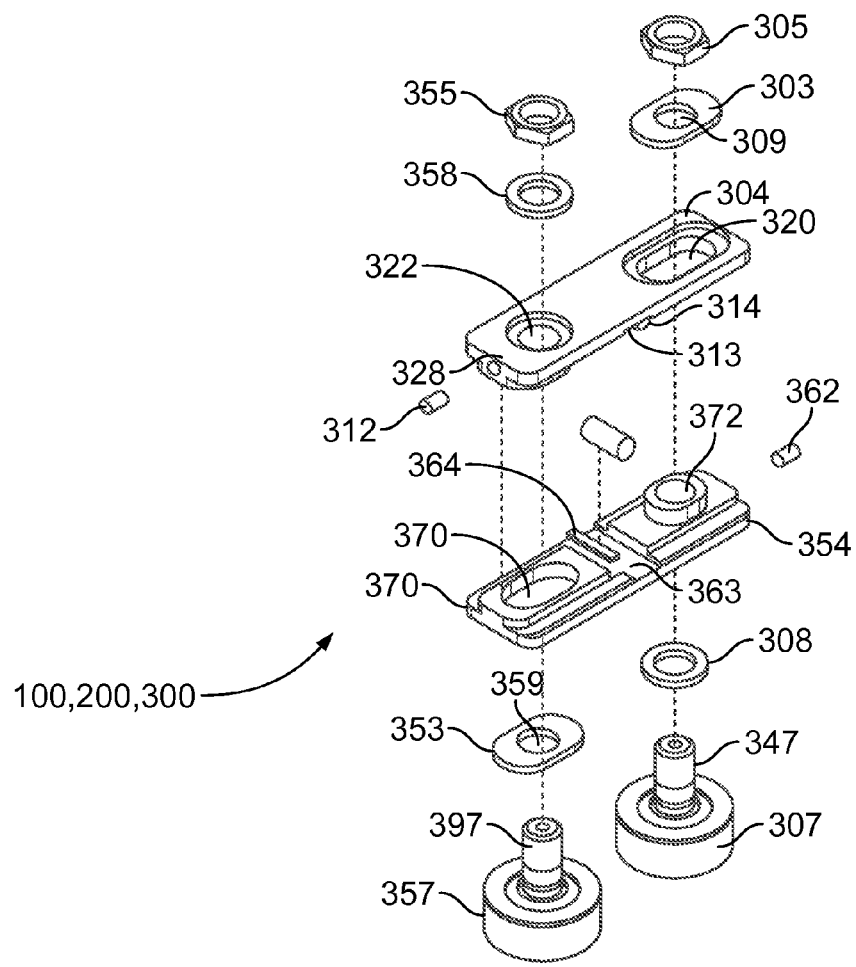
FIG. 11A is an exploded view of a cam follower arrangement according to aspects of the present invention.
Figure 12A:
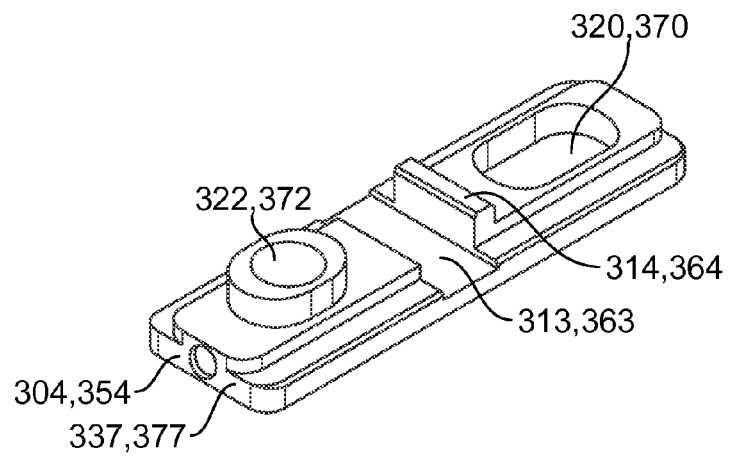
FIG. 12A is a side elevated view of a holding member according to aspects of the present invention.
Figure 12B:
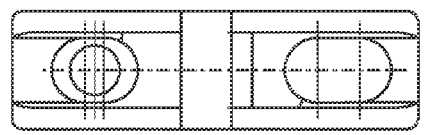
FIG. 12B is a top view of the holding member of FIG. 12A.
Figure 12C:
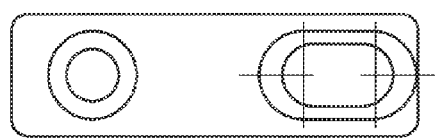
FIG. 12C is a bottom view of the holding member of FIG. 12A.
Figure 12D:
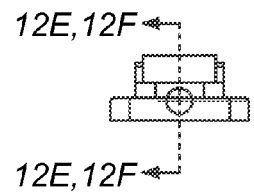
FIG. 12D is a front view of the holding member of FIG. 12A.

As shown, for example, in FIGS. 11A and 12A, the first holding element 304, 354 includes openings 320, 322 and the second holding element 354 includes openings 370, 372. When the first holding element 304 is assembled with the second holding element 354, the openings 322 and 370 combine to receive the cam follower 357 and the openings 320 and 372 combine to receive the cam follower 307. As shown in FIGS. 11A and 12A, the openings 320, 370 may be longer in the axial direction than the openings 322, 372. In general, the openings 320, 370 and the openings 322, 372 are dimensioned to allow the first holding element 304 and the second holding element 354 to move relative to each other in the axial direction. In other words, the cam follower 357 coupled to the first holding element 304 via the opening 322 can move axially within the opening 370, while simultaneously the cam follower 307 coupled to the second holding element 354 via the opening 372 can move axially within the opening 320. The width and height of the openings 320, 322, 370, 372 may vary depending on the dimensions of the cam follower arrangement. In some embodiments, the openings 320, 370 may have substantially the same height and width as the openings 322, 372, but the heights and widths may vary as long as they allow the desired relative movement between the first holding element 304 and the second holding element 354.

Figure 14A:
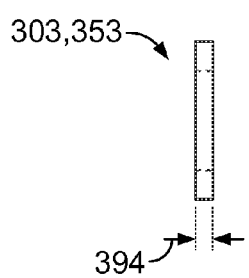
FIG. 14A is a side view of a plate of a cam follower arrangement according to aspects of the present invention.
Figure 14B:
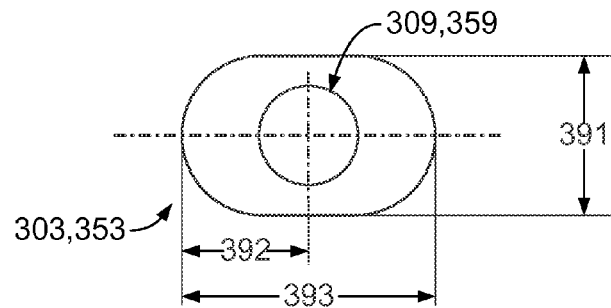
FIG. 14B is a top view of the plate of FIG. 14A.

As shown, for example, in FIGS. 11A, 14A, and 14B, the openings 320, 370 are configured to receive first and second sliding plates 303, 353, respectively. In some embodiments, the first and second plates 303, 353 may be substantially similar. The first openings 320, 370 may be axially longer than the respective first and second plates 303, 353, so that the first and second plates 303, 353 can move axially within the openings 320, 270. In particular, the first and second plates 303, 353 move within the first openings 320, 370 when cam follower arrangement transitions from the working state to the non-working state.

The thickness, length, and width of the first and second plates 303, 353 may vary according to the dimensions of the cam follower arrangement. As FIGS. 14A and 14B illustrate, for example, the thickness 394, length 393 and width 391 of the first and second plates 303, 353 may be about 0.12 inches, 1.60 inches, and 0.997-1.003 inches, respectively. In general, the first and second plates 303, 353 are dimensioned so that they allow the cam follower arrangement to fit and move properly in the corresponding housing opening.

Referring to FIG. 11A, the first and second plates 303, 353 include an opening 309, 359 that receives the cam followers 307, 357. In some embodiments, the openings 309, 359 may be located approximately at the center of the first and second plates 303, 353. For example, if the length 393 of the first and second plates 303, 353 is about 1.60 inches, the center of the openings 309, 359 are located axially at a distance 392 of about 0.80 inches from either end of the first and second plates 303, 353. In general, the diameter range for the openings 309, 359 may vary depending on the size of the cam follower arrangement. As shown in FIG. 11A, the cam follower 307 includes a shaft 347 that extends through the opening 309 of the first plate 303, and the cam follower 357 includes a shaft 397 that extends through the opening 359 of the second plate 353. The shafts 347, 397 couple the respective cam followers 307, 357 to the other components of the cam follower arrangement. For example, in some embodiments, the space between the shafts 347, 397 and the walls of the respective openings 309, 359 may be between about 0.004 to about 0.008 inches. In general, the movement of the first and second plates 303, 353 allows the first and second holding elements 304, 354 to move relative to each other even when the shafts 347, 397 pass through both the first and second holding elements 304, 354.

As shown further in FIG. 11A, the openings 322, 372 are configured to receive first and second washers 308, 358, respectively. The diameter of the openings 322, 372 may be substantially the same as the outer diameter of the washers 308, 358 such that the washers 308, 358 are generally prevented from moving within the respective openings of the washers 308, 358. In general, the outer diameter range of the washers 308, 358 may vary. The shaft 347 of the cam follower 307 extends through the opening of the first washer 308, and the shaft 397 of the cam follower 357 extends through the opening of the second washer 358. The space between the shaft 347, 397 and the walls of the respective openings 309, 359 may be between about 0.004 to about 0.008 inches.

Figure 11B:
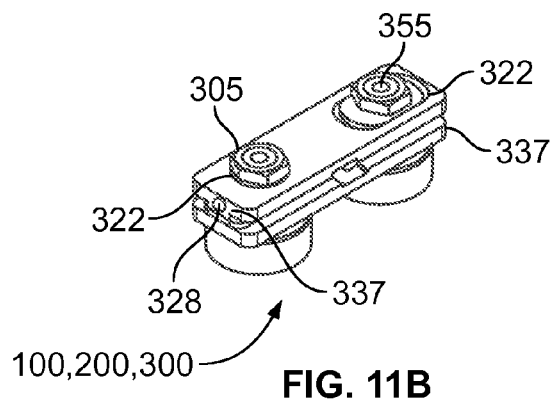
FIG. 11B is an assembled side perspective view of the cam follower arrangement of FIG. 11A.
Figure 11C:
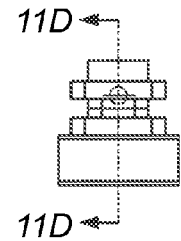
FIG. 11C is a front view of the cam follower arrangement of FIG. 11B when the cam follower arrangement is in the non-working position.

Referring to FIGS. 11A and 11B, the opening 320 is configured to receive a first nut 305 that receives the shaft 347 to secure the cam follower 307 in the cam follower arrangement. Similarly, the opening 322 is configured to receive a second nut 355 that receives the shaft 397 and secures the cam follower 357 in the cam follower arrangement. The first washer 308 may abut a head of the first cam follower 307 when the first cam follower 307 is assembled in the cam follower arrangement, and the second washer 358 may abut the nut 355 when the second cam follower 357 is assembled in the cam follower arrangement.

As FIGS. 8, 9, 11A, and 12A illustrate, for example, the first and second holding elements 304, 354 may include respective recesses 313, 363 and projections 314, 364 that are configured to form an enclosure 506 for receiving the adjusting element 360. When the first and second holding elements 304, 354 are assembled together, the recess 313 of the first holding element 304 faces the recess 363 of the second holding element 354. In addition, the projection 314 extends from the first holding element 304 toward the second holding element 354 (without making contact), and the projection 364 extends from the second holding element 354 toward the first holding element 304 (without making contact). In some embodiments, the enclosure 506 may be positioned substantially in the center of the cam follower arrangement.

Figure 13A:
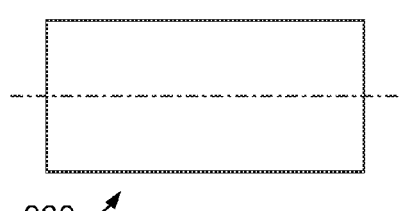
FIG. 13A is a side view of an elastic element of a cam follower arrangement according to aspects of the present invention.
Figure 13B:
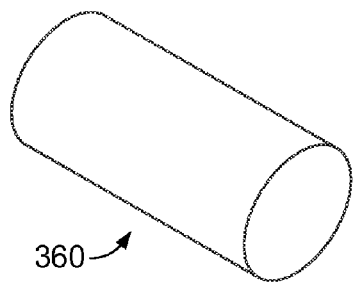
FIG. 13B is a side elevated view of the elastic element of FIG. 13A.

The adjusting element 360, which is installed into the enclosure 506 in the assembled cam follower arrangement, may be formed from any suitable compressible/expandable material of any shape. For example, the adjusting element 360 may be formed from polyurethane (e.g. urethane or the like) and/or other suitable compressible/expandable material. In addition, the adjusting element 360 may be substantially cylindrical as shown in FIGS. 13A and 13B, substantially spherical, substantially square, substantially rectangular, or any other shape. When the adjusting element is installed into the enclosure 506, the adjusting element 360 is compressed. For example, when the adjusting element 360 is in its most relaxed (uncompressed) state and at its maximum width, the adjusting element 360 may be about 0.375 inches wide. When compressed in the enclosure 506, however, the width of the adjusting element 360 may be reduced to about 0.298 inches when the cam follower arrangement is in the non-working state and about 0.286 inches when the cam follower arrangement is in the working state. Regardless of whether the adjusting element 360 is in the working or non-working state, the length of the adjusting element 360 may be between about 0.75 to about 0.85 inches, such as about 0.8 inches long as shown in FIG. 13A. In general, the diameter of the adjusting element 360 may vary depending on the overall dimensions of the cam follower arrangement.

As described above, the shaft 347 of the first cam follower 307 extends through the openings 320 and 372 and is coupled to the assembly of the first and second holding elements 304, 354 by a nut 305. Similarly, the shaft 397 of the second cam follower 357 extends through the openings 370 and 322 and is coupled to the assembly of the first and second holding elements 304, 354 by a nut 355. For each cam follower arrangement in a ram assembly, the first and second cam followers follow a cam, which determine the movement of the ram assembly for engaging an article and performing a working operation on the article. Because the ram assembly 40 described above includes two cam follower arrangements 100, 200, the ram assembly 40 includes a total of four cam followers. In some embodiments, the two cam followers of the first cam follower arrangement 100 may follow one cam 44 and the two cam followers of the second cam follower arrangement 200 may follow another cam 45. In contrast, the ram assembly 340 with a single cam follower arrangement only includes the cam followers that can follow one cam.

Figure 9:
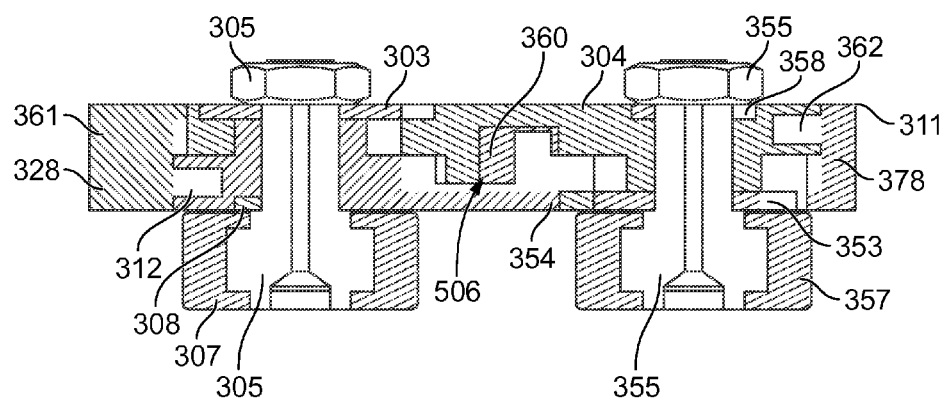
FIG. 9 is a cross sectional view of section E of FIG. 7.

As FIG. 11G illustrates, for example, the holding elements 304, 354 include contacting surfaces 503, 504. When the cam follower arrangement is in the working state, there is little or no clearance 500, 501 between the contacting surfaces 503, 504 and the respective working surfaces 311, 361 as shown in FIG. 9. When the cam followers 307, 357 are in the non-working state as shown in FIG. 11D, there may be from about 0.1 to about 0.4 inches total clearance 500, 501 such that the holding elements 304, 354 and the cam followers 307, 357 together move about 0.1 to about 0.4 inches in the axial direction to keep the cam followers 307, 357 in contact with the cam surfaces of the cam. The total clearance is the sum of the first clearance 500 and the second clearance 501.

Figure 5:
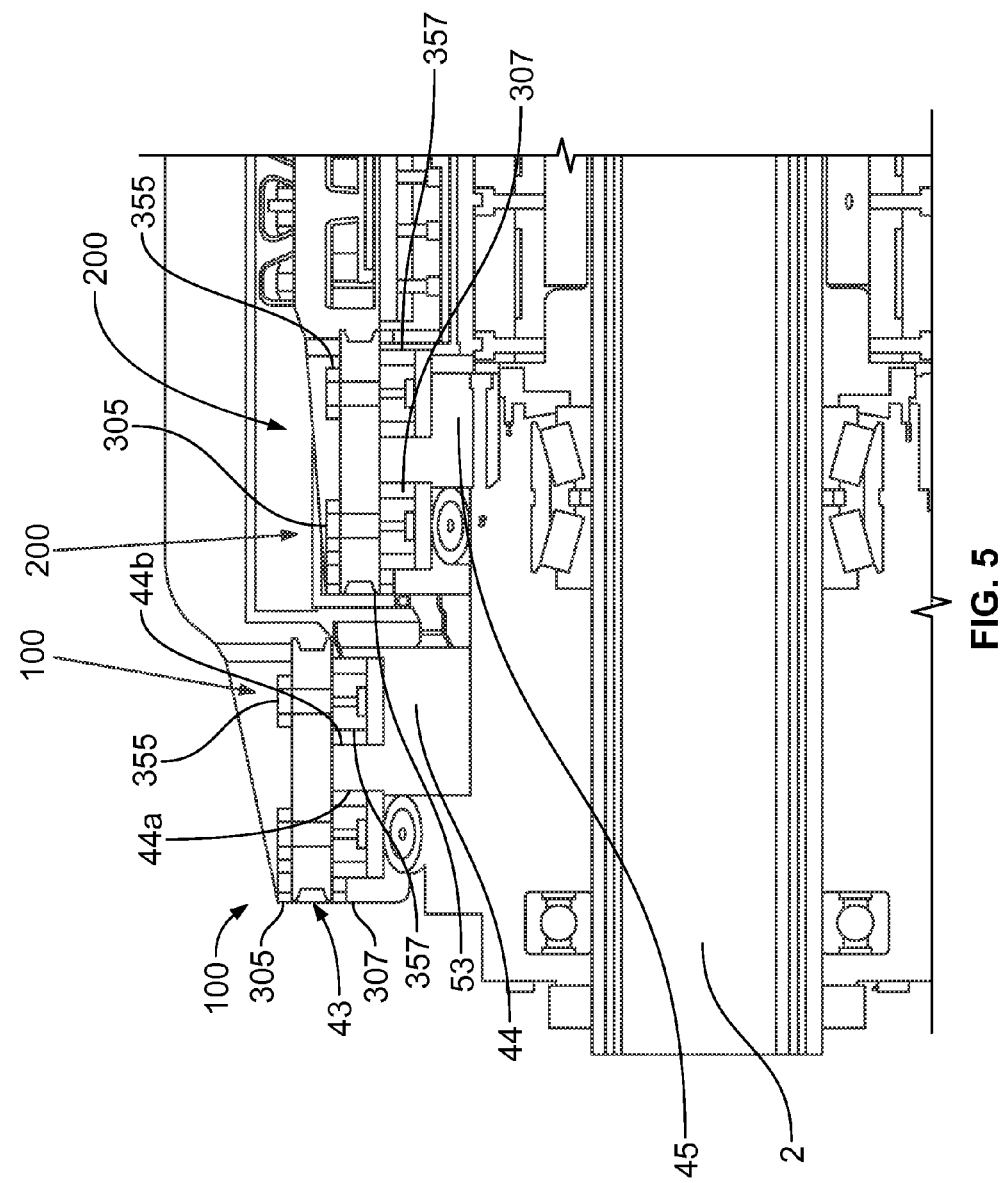
FIG. 5 is a close-up view of section D of FIG. 2.

When the cam followers 307, 357 move from the working state to the non-working state, the cam followers 307, 357 remain in contact with the cam surfaces of the cam along the axial direction. For example, as shown in FIG. 5, when the cam follower arrangement 100 is housed in the housing 43, the cam follower 307 remains in contact with the cam/rib surfaces 44a, 44b of the cam 44, and the cam follower 357 remains in contact with the cam/rib surfaces 45a, 45b of the cam 45 so that the cam followers 307, 357 do not skid along the corresponding cam surfaces 44a, 44b, 45a, 45b along the axis 15-15. The cam surfaces 44a, 44b, 45a, 45b are perpendicular to the axis 15-15, such that the cam followers 307, 357 move in a direction perpendicular to the corresponding cam surfaces 44a, 44b, 45a, 45b and parallel to the axis 15-15 when the cam followers 307, 357 remain in contact with the corresponding cam surfaces 44a, 44b, 45a, 45b.

The adjusting element 360 is disposed in the enclosure 506 between the first and second holding elements 304, 354 and is configured to act on the first and second holding elements 304, 354 and minimize the clearances 500, 501 between the first and second holding elements 304, 354 and the respective working surfaces 311, 361, thereby keeping the cam followers 307, 357 in contact with the cam surfaces.

Figure 10:
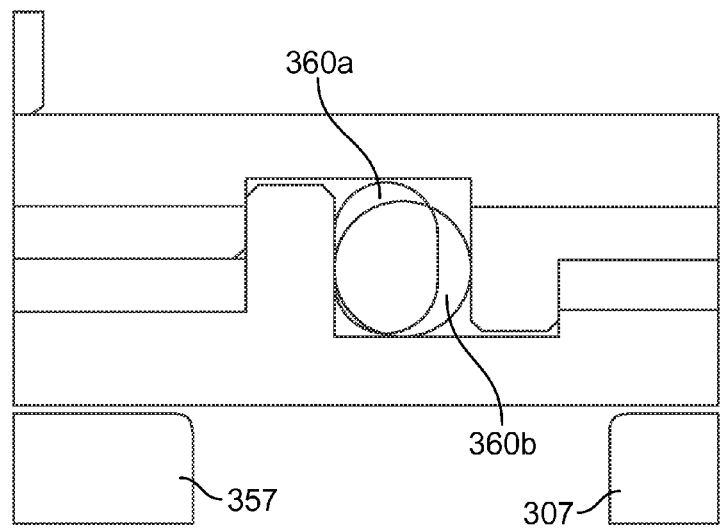
FIG. 10 is a close-up of a cam follower arrangement in a working position and in a non-working position according to aspects of the present invention.

As FIG. 10 illustrates, for example, the adjusting element 360 is configured to move as the cam follower arrangement transitions from a working state to a non-working state. In the working state, the adjusting element 360a is compressed and is smaller in dimension. In the non-working state, the adjusting element 360b is relaxed and is greater in dimension. The diameter of the adjusting element 360a in the working position is smaller than the diameter of the adjusting element 360b in the non-working state.

The adjusting element 360 is configured to allow the cam follower arrangement to float within the opening of the housing. The adjusting element 360 compresses or expands to allow the cam follower arrangement to translate in the housing along the axis 15-15. As such, the adjusting element 360 applies a bias to keep the cam followers 307, 357 in contact with the cam surfaces of the cam. Without the adjusting element 360, separation may occur between the cam followers 307, 357 and the cam surfaces due to dimensional variation of the cam followers and cam surfaces. Disadvantageously, this allows the cam followers 307, 357 to skid along the cam surfaces.

Advantageously, the force that the adjusting element 360 exerts on the cam followers 307, 357 and thus the cam surfaces may be smaller than the force of springs used in conventional cam follower arrangements. In some embodiments, the force that the adjusting element 360 exerts may decrease by about 125 lbf to about 175 lbf as compared to conventional cam follower arrangements. Thus, the life expectancy of the cam and cam followers may increase by approximately 23-33% as compared to conventional systems.

As FIGS. 8, 11A, and 11D illustrate, for example, the first and second holding elements 304, 354 may include side openings 328, 378 configured to receive working elements 312, 362, respectively. When the cam follower arrangement is received into the opening of the housing, the working elements 312, 362 are disposed between the first and second holding elements 304, 354 and the walls of the openings, respectively. The working elements 312, 362 act to absorb energy and reduce noise generated when the first and second holding elements 304, 354 move into contact with the walls of the openings the housing. For example, as shown in FIG. 9, the holding elements 304, 354 may exert loads $W_A$ and $W_B$ with magnitudes of about 75 lbf to about 500 lbf on the housing, but the working elements 312, 362, however, absorb much of the loads and reduce the noise generated the contact. In contrast to other cam follower arrangements that exert high loads $W_A, W_B$ in the working state with high cam follower pre-load forces (e.g. about 150 lbf to about 200 lbf), cam follower arrangements in present embodiments may exert a high loads $W_A$, $W_B$ in the working state but a low cam follower pre-load force (e.g. about 25 lbf). The working elements 312, 362 exert a negligible force on the holding elements 304, 354 in the working state. For example, the working elements 312, 362 may exert less than about 6 lbf on the holding elements 304, 354 during the working state. The working elements 312, 362 may not apply any force during the non-working state. Although the use of working elements offers advantages, it is understood that some embodiments may omit the use of such working elements.

The working element 312, 362 may be formed from polyurethane (e.g. urethane or the like) and/or any suitable energy-absorbing material. The working elements 312, 362 may be substantially cylindrical, substantially spherical, substantially square, substantially rectangular, or any other shape.

Figure 15:
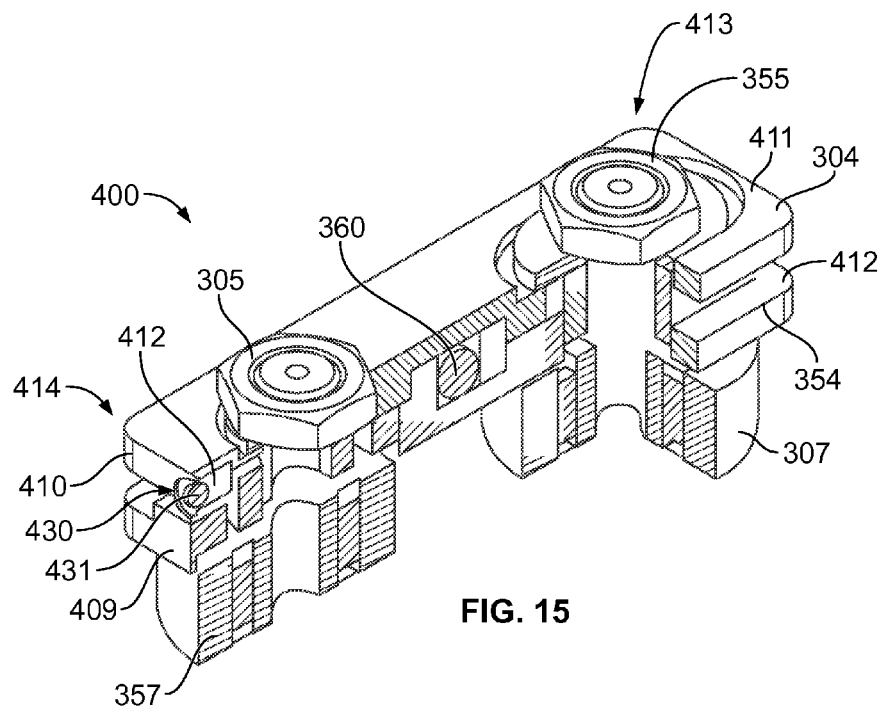
FIG. 15 is a partial cut-out view of a cam follower arrangement according to aspects of the present invention.

While the cam follower arrangements shown in FIGS. 1-14 employ working elements 312, 362 formed from a single shaped piece of material as described above, FIG. 15 illustrates an embodiment that employs alternative working elements 430 which include a spring and ball assembly. As shown in FIG. 15, a cam follower arrangement 400 may include an adjusting element 360 and two working elements 430. The cam follower arrangement 400 may be substantially similar to the cam follower arrangements 100, 200, 300 except for the use of the working elements 430.

Like working elements 312, 362, the working elements 430 act to absorb energy and reduce noise generated when the first and second holding elements 304, 354 move into contact with the walls of the openings the housing. Unlike the working elements 312, 362, however, the working elements 430 may have a longer life due to the use of the spring and ball assembly.

In particular, the working elements 430 may each include a ball 431 and a spring 412 and, like the working elements 312, 362, may be located at the respective ends 413, 414 of the first and second holding elements 304, 354. The first and second working elements 430 each include an enclosure that is sized to receive the ball 431 and the spring 412. The spring 412 engages the ball 431 and biases the ball 431 from the ends 413, 414.

The size of the working element 430 may vary, and the ball 431 and spring 412 of the working elements 430 may include any suitable shape and dimensions. For example, in embodiments, the working elements 430 may be about 0.24 inches diameter and about 0.39 inches long. In some instances, it may be possible to eliminate the working element 430. In addition, the enclosure of the working element 430 may be formed as a urethane cylindrical plug.

Although the embodiments described herein may include an adjusting element 360 and optionally two working elements 312, 316 or 430, other combinations of adjusting elements and/or working elements are contemplated. For example, some cam follower arrangements may employ two adjusting elements only. Each of the two adjusting elements may be located at the ends of the first and second holding elements 304, 354 such that there is no adjusting element centrally located in the cam follower arrangement. As another embodiment, a cam follower arrangement may have only one adjusting element that is located at an end of the first or second holding element 304, 354. Yet, according to another embodiment, the cam follower arrangement may have two adjusting elements where the first adjusting element is located at an end of the cam follower arrangement and the second adjusting element is centrally located in the cam follower arrangement.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges or value provided. Accordingly, these terms should be interpreted as indicating that insubstantial or inconsequential modifications or alterations of the subject matter described and are considered to be within the scope of the disclosure, such that the recited numerical range or value may be close to or exactly within the range or value.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of the cam follower arrangement or components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A cam follower assembly, comprising:
a housing including an opening, the housing being coupled to a tool;
a first cam follower and a second cam follower configured to contact a cam surface;
a first holding element coupled to the first cam follower;
a second holding element coupled to the second cam follower, the second holding element being assembled with the first holding element to be received in the opening of the housing, the first holding element and the second holding element being configured to move relative to each other when assembled together; and
an adjusting element formed from a compressible material, the adjusting element providing a bias to the first holding element and the second holding element and determining the relative movement between the first holding element and the second holding element,
wherein the first cam follower and the second cam follower move relative to each other according to the relative movement between the first holding element and the second holding element, the first cam follower and the second cam follower maintaining contact with the cam surface according to the relative movement between the first cam follower and the second cam follower, and the cam surface determines the movement of the tool coupled to the housing, and
wherein the first holding element includes a first opening configured to receive the second cam follower therethrough, the first opening being shaped to provide for the axial movement of the second cam follower.

2. The cam follower assembly of claim 1, further comprising at least one working element, the at least one working element being disposed between the housing and the assembled first holding element and second holding element when the assembled first holding element and second holding element is disposed in the opening.

3. The cam follower assembly of claim 1, wherein the assembled first holding element and second holding element move relative to the housing in the opening.

4. The cam follower assembly of claim 1, wherein the adjusting element is formed from polyurethane.

5. The cam follower assembly of claim 1, wherein the first holding element and the second holding element, when assembled, define a cavity, the adjusting element being enclosed within the cavity defined by the first holding element and the second holding element.

6. The cam follower assembly of claim 1, wherein the first holding element includes a first projection and a first recess and the second holding element includes a second projection and a second recess, and wherein the first projection, the first recess, the second projection, and the second recess define an enclosure having the adjusting element disposed therein, the first projection being disposed on a side of the adjusting element opposite the second projection.

7. The cam follower assembly of claim 1, further comprising a projection extending from a surface of the first holding element, the projection being configured to engage the adjusting element, the engagement with the adjusting element biasing the first holding element in a first axial direction.

8. The cam follower assembly of claim 7, wherein the projection is disposed between the first cam follower and the second cam follower when the first holding element is assembled with the second holding element.

9. The cam follower assembly of claim 7, wherein the first holding element further includes a recess adjacent the projection, the recess being configured to receive the adjusting element therein.

10. The cam follower assembly of claim 7, further comprising a second projection extending from a surface of the second holding element, the second projection being configured to engage the adjusting element, the engagement with the adjusting element biasing the second holding element in a second axial direction.

11. The cam follower assembly of claim 1, wherein the first cam follower is fixed to the first holding element.

12. The cam follower assembly of claim 1, wherein the first cam follower extends from a side of the first holding element that is opposite the adjusting element.

13. The cam follower assembly of claim 1, further comprising a projection extending from a surface of the second holding element, the projection being configured to engage the adjusting element, the engagement with the adjusting element biasing the second holding element in a first axial direction.

14. The cam follower assembly of claim 13, wherein the projection is disposed between the first cam follower and the second cam follower when the second holding element is assembled with the first holding element.

15. The cam follower assembly of claim 13, wherein the first holding element further includes a recess adjacent the projection, the recess being configured to receive the adjusting element therein.

16. The cam follower assembly of claim 1, wherein the second cam follower is fixed to the second holding element.

17. The cam follower assembly of claim 1, wherein the second cam follower extends from a side of the second holding element the same as the adjusting element.

* * * * *